US010412626B2

(12) United States Patent
Muehlmann et al.

(10) Patent No.: US 10,412,626 B2
(45) Date of Patent: Sep. 10, 2019

(54) METHOD AND APPARATUS FOR OPTIMUM CHANNEL COMBINATION FOR NFC TRANSCEIVERS

(71) Applicant: NXP B.V., Eindhoven (NL)

(72) Inventors: Ulrich Muehlmann, Gratkorn (AU); Stefan Mendel, Gratkorn (AU); Radha Srinivasan, Irvine, CA (US)

(73) Assignee: NXP B.V., Eindhoven (NL)

( * ) Notice: Subject to any disclaimer, the term of this patent is extended or adjusted under 35 U.S.C. 154(b) by 112 days.

(21) Appl. No.: 15/706,426

(22) Filed: Sep. 15, 2017

(65) Prior Publication Data

US 2019/0090155 A1 Mar. 21, 2019

(51) Int. Cl.

| | |
|---|---|
| ***H04L 12/26*** | (2006.01) |
| ***H04W 28/04*** | (2009.01) |
| ***H04L 5/00*** | (2006.01) |
| ***H04W 28/02*** | (2009.01) |
| ***H04W 28/06*** | (2009.01) |
| ***H04L 29/06*** | (2006.01) |
| ***H04W 4/80*** | (2018.01) |
| ***H04B 5/00*** | (2006.01) |
| ***H04B 7/08*** | (2006.01) |
| *H04W 48/08* | (2009.01) |
| *H04W 72/04* | (2009.01) |

(52) U.S. Cl.

CPC .......... *H04W 28/04* (2013.01); *H04B 5/0025* (2013.01); *H04B 7/0848* (2013.01); *H04L 5/0005* (2013.01); *H04L 65/80* (2013.01); *H04W 4/80* (2018.02); *H04W 28/0263* (2013.01); *H04W 28/06* (2013.01); *H04W 48/08* (2013.01); *H04W 72/0453* (2013.01)

(58) Field of Classification Search

CPC ... H04W 28/04; H04W 4/80; H04W 28/0263; H04L 5/0005; H04L 65/80

See application file for complete search history.

(56) References Cited

U.S. PATENT DOCUMENTS

| | | | | |
|---|---|---|---|---|
| 5,528,581 | A | 6/1996 | De Bot | |
| 6,763,062 | B1 * | 7/2004 | Kohno | H01Q 3/2605 375/219 |
| 2003/0203728 | A1 * | 10/2003 | Filipovic | H03D 3/008 455/234.2 |
| 2010/0278036 | A1 * | 11/2010 | Dai | H04B 7/026 370/216 |
| 2011/0133895 | A1 | 6/2011 | Wu et al. | |

FOREIGN PATENT DOCUMENTS

| | | | |
|---|---|---|---|
| EP | 0700184 | A2 | 3/1996 |
| WO | 01/20795 | A2 | 3/2001 |

OTHER PUBLICATIONS

D.G. Brennan, "Linear diversity combining techniques," Proc. IRE, vol. 47, No. 1, pp. 1075-1102, Jun. 1959.

* cited by examiner

*Primary Examiner* — Minh Trang T Nguyen

(57) ABSTRACT

Various embodiments relate to a method and circuit for combining channels, the method including receiving, by a matching and smoothing filter, a signal from an analog to digital converter and extracting a root mean square signal level, receiving, by a noise power detector ("NPD"), the signal from the ADC and assessing noise contribution on the signal and receiving, by a maximum ratio combiner, the signal from the matching and smoothing filter wherein a combiner selects between using a geometric sum and an arithmetic sum to combine the channels.

18 Claims, 6 Drawing Sheets

600
START 601
receives, by a matching and smoothing filter, a signal from an analog to digital converter 602
extracts, by the matching and smoothing filter, a root mean square signal level 603
receives, by a noise power detector, the signal from the ADC 604
assesses, by a noise power detector, noise contribution on the signal 605
receives, by a maximum ratio combiner, the signal from the matching and smoothing filter 606
selects, by a combiner, between using a geometric sum and an arithmetic sum 607
END 608

METHOD AND APPARATUS FOR OPTIMUM CHANNEL COMBINATION FOR NFC TRANSCEIVERS

TECHNICAL FIELD

This disclosure relates generally to a channel combiner for NFC transceivers, and more specifically, but not exclusively, to a channel combiner which reduces the bit error rate and increases the signal-to-noise ratio ("SNR").

BACKGROUND

Current Near-Field Communication ("NFC") transceivers are either equipped with a poor or no channel combiner unit.

Instead, NFC transceivers select the strongest channel only or alternatively form a combined information source by simply adding the channel information together. This current approach is suboptimal in terms of detection probability, sensitivity bounds and SNR.

In a first approach, selecting the strongest channel may lead to false detection when the signal is weak or when one channel contains additive noise that is stronger than the received signal.

The above described approach can easily occur in a direct conversion receiver architecture, where the receiver ("Rx") input is sampled with the carrier signal in order to convert it to the baseband signal. During the down conversion operation, when one channel samples close to the zero-crossing instant of the carrier, high residual phase-noise contribution called phase modulation to amplitude modulation ("PM-to-AM") conversion may occur.

In the second approach, combining the information sources by adding the channel information together may be problematic when the channel phase delays and group delays are different which occurs by the coupling system physics visible by different upper and lower sideband levels.

In a third approach, using two independently running single sideband receivers where the final output of the two channels are synchronized and added together may be complex, expensive, and synchronization may fail when one channel provides a lower SNR.

FIG. 1 illustrates a current NFC frontend architecture 100. The NFC frontend architecture 100 includes an antenna 101, a high frequency attenuator ("HF-ATT) 102, mixers 103 and 104, baseband filters ("BBF") 105 and 106, baseband amplifiers ("BBA") 107 and 108, analog-to-digital converters ("ADC") 109 and 110 and a digital signal processor ("DSP") 111.

The load modulation amplitude ("LMA") of the NFC target, or passive card or ticket reaches the antenna 101 with an arbitrary phase and magnitude. After input range adjustments by the HF-ATT 102, the signal is down converted using a Nyquist sampling IQ down conversion method.

The resulting in-phase and quadrature samples are band-pass filtered using BBF 105, amplified using BBA 107 then passed through the ADC 109 and processed in the digital domain by the DSP 111.

The applied Nyquist sampling method has moderate complexity and strain is put on the phase noise performance of the reference clock.

SUMMARY OF EXEMPLARY EMBODIMENTS

A brief summary of various embodiments is presented below. Embodiments address the need to create a method and apparatus for combining channels from a NFC transceiver to reduce bit error rate and increase SNR of the combined signal.

In order to overcome these and other shortcomings of the prior art and in light of the need to create a method and apparatus for combining channels from a NFC transceiver to reduce bit error rate and increase SNR of the combined signal, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a channel combiner coupled to a NFC transceiver, the channel combiner including a first and second channel wherein each channel includes a matching and smoothing filter configured to receive a signal from an analog to digital converter ("ADC") and configured to extract a root mean square ("RMS") signal level, a noise power detector ("NPD") configured to receive the signal from the ADC and assess noise contribution on the signal and a maximum ratio combiner configured to receive the signal from the matching and smoothing filter and a combiner configured to select between using a geometric sum and an arithmetic sum to combine signals from the first channel and the second channel.

In an embodiment of the present disclosure, the maximum ratio combiner is configured to receive the noise contribution on the signal from the NPD.

In an embodiment of the present disclosure, the maximum ratio combiner is configured to receive phase delays from a lookup table.

In an embodiment of the present disclosure, the lookup table is disabled and the combiner uses a geometric sum when the modulation schemes are active load modulation and passive load modulation.

In an embodiment of the present disclosure, the lookup table is enabled and the channel combiner uses an arithmetic sum when the modulation scheme is passive load modulation.

In an embodiment of the present disclosure, the NFC transceiver includes a baseband filter.

In an embodiment of the present disclosure, the NFC transceiver includes a digital DC removal control loop configured to calculate channel gains.

In an embodiment of the present disclosure, the lookup table is disabled when the modulation schemes are active load modulation and passive load modulation.

In an embodiment of the present disclosure, the lookup table is enabled and the channel combiner uses an arithmetic sum when the modulation scheme is passive load modulation.

In an embodiment of the present disclosure, the RMS signal level are independent of initial phase and a function of a sampling phase delay.

Various embodiments described herein relate to a method for combining channels, the method including steps of receiving, by a matching and smoothing filter, a signal from an analog to digital converter ("ADC") and extracting a root mean square ("RMS") signal level, receiving, by a noise power detector ("NPD"), the signal from the ADC and assessing noise contribution on the signal and receiving, by a maximum ratio combiner, the signal from the matching and smoothing filter, wherein a combiner selects between using a geometric sum and an arithmetic sum to combine the channels.

In an embodiment of the present disclosure, the maximum ratio combiner is configured to receive the noise contribution on the signal from the NPD.

In an embodiment of the present disclosure, the maximum ratio combiner is configured to receive phase delays from a lookup table.

In an embodiment of the present disclosure, the lookup table is disabled and the combiner uses a geometric sum when the modulation schemes are active load modulation and passive load modulation.

In an embodiment of the present disclosure, the lookup table is enabled and the channel combiner uses an arithmetic sum when the modulation scheme is passive load modulation.

In an embodiment of the present disclosure, the NFC transceiver includes a baseband filter.

In an embodiment of the present disclosure, the NFC transceiver includes a digital DC removal control loop configured to calculate channel gains.

In an embodiment of the present disclosure, the lookup table is disabled when the modulation schemes are active load modulation and passive load modulation.

In an embodiment of the present disclosure, the lookup table is enabled and the channel combiner uses an arithmetic sum when the modulation scheme is passive load modulation.

In an embodiment of the present disclosure, the RMS signal level are independent of initial phase and a function of a sampling phase delay.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
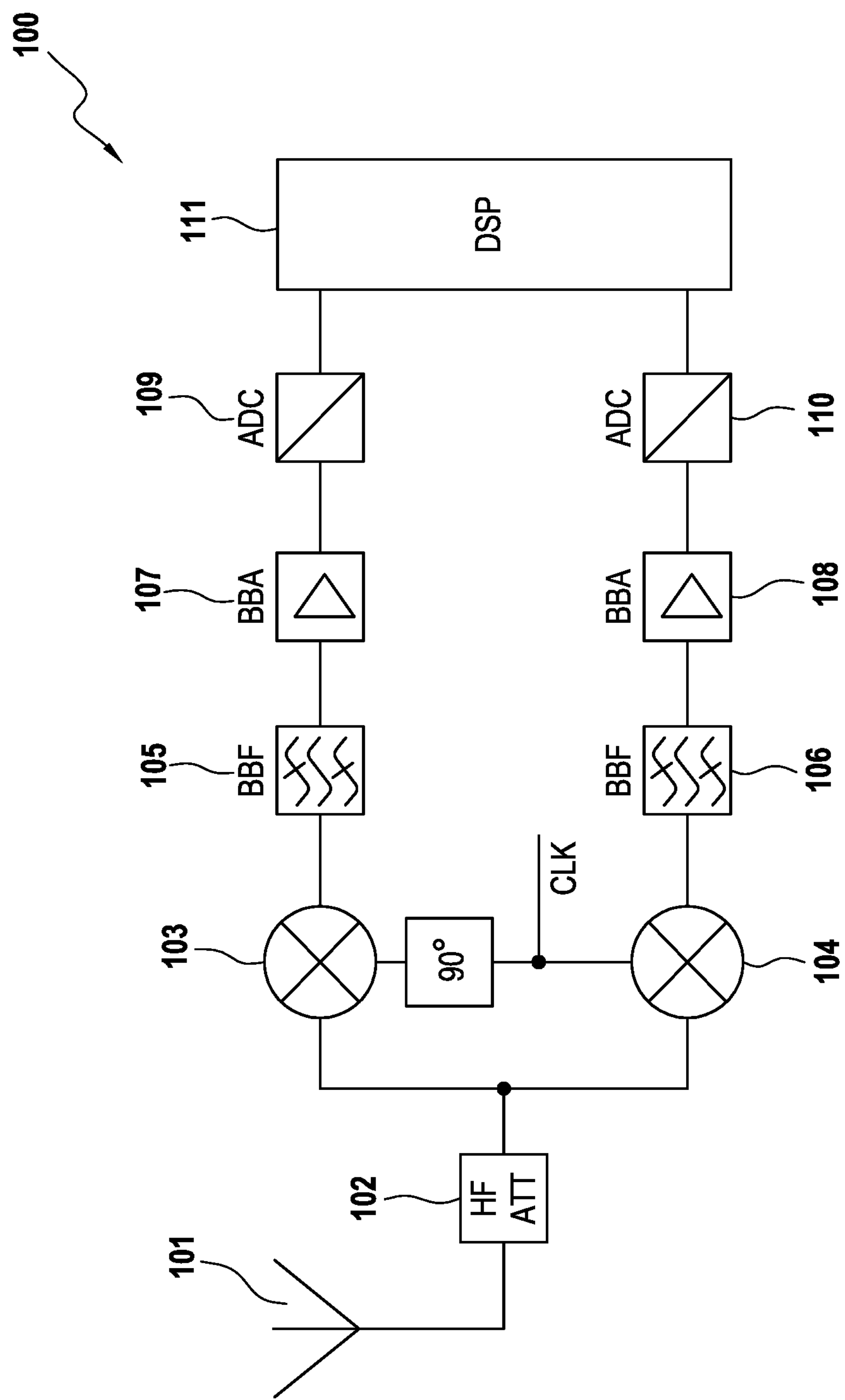
FIG. 1 illustrates a block diagram of a NFC transceiver.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

These embodiments address the need to create a method and apparatus for combining channels from a NFC transceiver to reduce bit error rate and increase SNR of the combined signal.

The embodiments are applicable to multi-antenna, multi-channel systems and not limited to a dual channel system.

In order to achieve an optimum channel combiner, the gain of each channel must be proportional to the received root mean square ("RMS") signal level and the gain of each channel must be inversely proportional to the individual mean square noise level.

If the gain is proportional to the received RMS signal and inversely proportional to the individual mean square noise level, then the output power ratio P, defined as the sum of the local power ratios $p_i$:

$$P = \sum_{i=1}^{N} p_i$$

is maximal in terms of SNR.

However, in order to determine whether gain is proportional to the received RMS signal and inversely proportional to the individual mean square noise level, the noise variance and the signal gain of each channel must be known.

However, these variables must be known prior to the channel combining procedure.

A first embodiment addresses the I/Q signal phase shift by using a matched and smoothing filter concept that delivers the RMS signal level of the modulation amplitude to be combined.

A second embodiment includes a noise power estimator or similar means for detecting the channel input noise levels to complete the optimum combiner. The noise estimator assesses the noise contribution of the phase locked loop ("PLL") and/or other noise sources on every channel.

Figure 2:
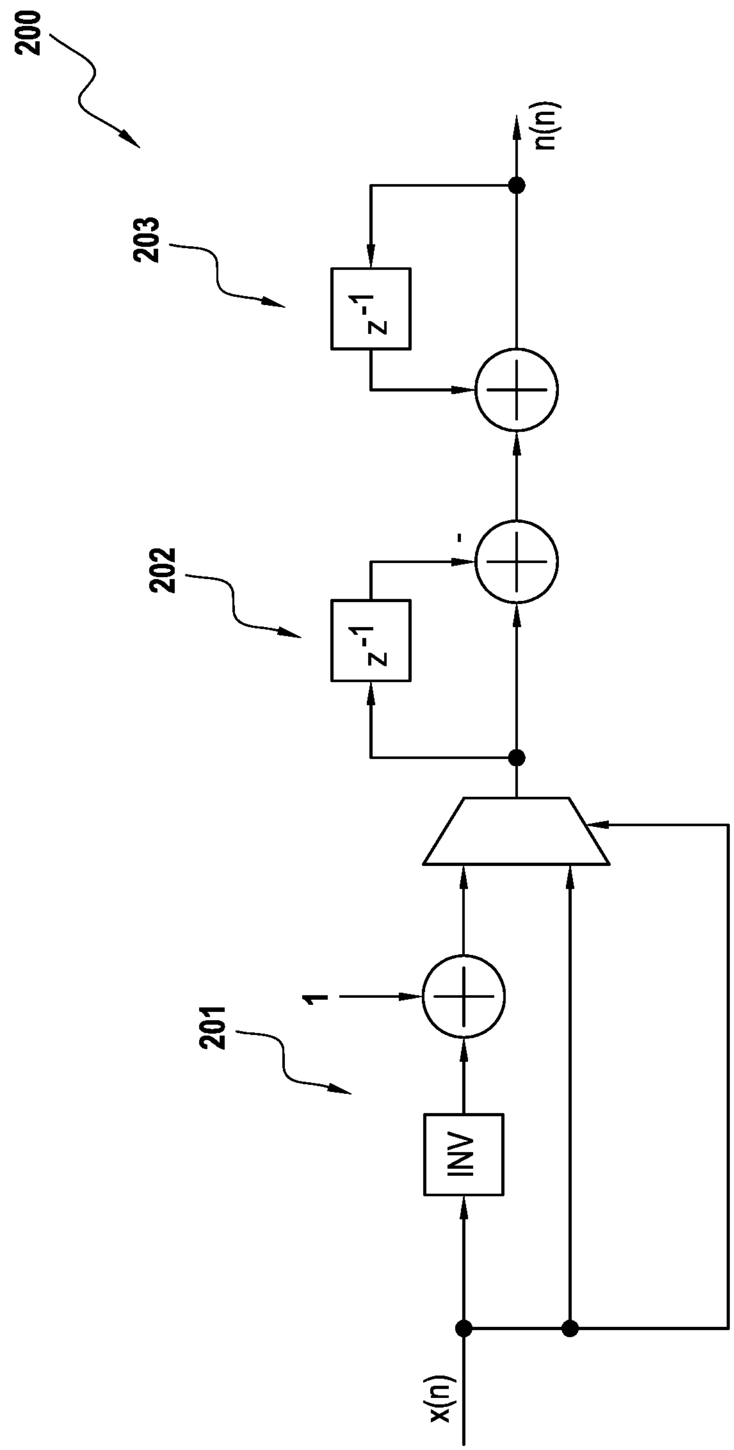
FIG. 2 illustrates a block diagram of a noise power detector.

FIG. 2 illustrates an example of a noise power detector ("NPD") 200.

The NPD 200 includes an absolute value calculation ("ABS") operation 201, a differentiator 202 and an integrator 203, in series. The integrator 203 is enabled for a set of samples (e.g., 64, 256, etc.) and the result is scaled accordingly.

If the number of samples is a function of 2×, then the summing stage and the scaling operations are simple.

For a sampling frequency of 13.56 MHz, the maximum magnitude deviation of this kind of NPD is approximately 1.7 dB which may be corrected by an overall compensation factor of 0.8 for a normal distribution random noise and similar compensation factors can be calculated for other distributions and detectors. The measurement must be observed without the presence of a wanted signal.

The RMS signal level is gained by using matched and smoothing filters. The output of the applied signal processing method must be independent of channel phase delays in order for the channel combiner to operate without additional channel synchronization.

Figure 3:
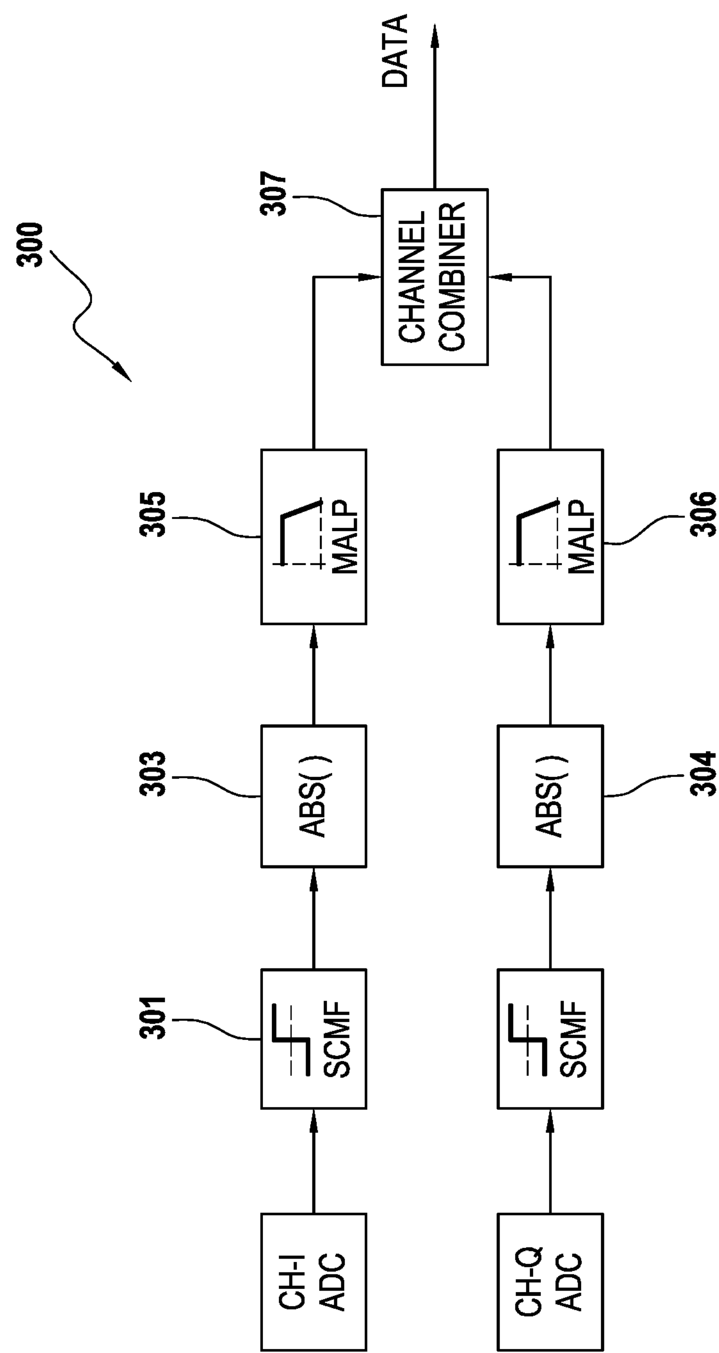
FIG. 3 illustrates a block diagram for signal conditioning.

FIG. 3 illustrates a block diagram for signal conditioning block 300.

The signal conditioning block 300 includes subcarrier matched filters ("SCMF") 301 and 302 composed of a replica of e.g. standard ISO14443 wave shapes, absolute value blocks ("ABS") 303 and 304, and low pass smoothing filters 305 and 306 for RMS signal detection. The low pass smoothing filters 305 and 306 input into the channel combiner 307.

The selected SCMF 301 and 302 and moving average low-pass filters ("MALP") 305 and 306 provide, on average, a signal proportional to the amplitude modulated signal of e.g. the NFC target device, a smartcard, or an electronic ticket.

The DC gains at the mixer outputs are proportional to the expected RMS output signals in the case of pure amplitude modulation.

Channel gains may be estimated based on the modulation scheme of the target device. Passive load modulation ("PLM") which is pure amplitude modulation ("AM") or a mix of amplitude and phase modulation, or active load modulation ("ALM") with and without initial phase variation control effect channel gains.

In the first embodiment, blind estimation of the channel gain may be performed. In the case of AM, the transmit and receive ("TX-RX") phase relationship (i.e., the I/Q phase relationship) can be measured.

With that relationship known, the channel gain may be calculated. The channel gain may be obtained by the DC gain of the individual channels after the down mixing stage and before band-pass filtering when ad-hoc signal gain detection is needed.

Ad-hoc detection is needed for NFC on/off key ("OOK") modulation schemes (e.g., TYPEA106k, ISO15693) because these schemes do not feature a preamble useful for initial signal gain detection purpose.

The preamble method is advantageous over the DC method because it provides the actual channel gains independent of the modulation scheme present. However, there exists some architecture where the DC values are not available in the digital domain and the preamble method may still be applied.

In case the preamble method cannot be applied, the TX-RX phase can be estimated out of the channel noise power when phase noise ("PN") of the mixer clock is the main noise contributor.

This may be accomplished because there exists a direct relation between the TX-RX phase and PM-to-AM conversion, in a sampled receiver architecture.

The PM-to-AM conversion process as expressed as average noise power relation may be expressed as:

$$\overline{n_{jPN}^2} = \frac{1}{\vartheta_2 - \vartheta_1}\int_{\vartheta_1}^{\vartheta_2}\left(A\sin(f_{PN}(\vartheta)) - A\sin\left(\frac{\vartheta_1+\vartheta_2}{2}\right)\right)^2 d\vartheta,$$

Where $f_{PN}(\vartheta)$ is a normal distribution random noise process (a similar relation holds for Gaussian distribution). $\vartheta_1$ and $\vartheta_2$ define the phase noise spread $\vartheta_1$ including initial phase $\vartheta_0$. We can express $\vartheta_1$ and $\vartheta_2$ by $\vartheta_{1,2}=\vartheta_0\pm\vartheta_s$, and A represents the signal magnitude.

The phase noise spread is a system parameter dependent on the crystal quality used in the application and on the PLL performance of the integrated circuit ("IC").

By adding a calibration step of determining the maximum average noise power (normally at 90°, equal to zero crossing sampling), the actual TX to RX phase delays ($\sigma_{i,TXRX}$, $\sigma_{q,TXRX}$) can then be derived using a look-up table during operation with the aid of the embedded channel noise power detectors.

By knowing the individual channel PN contributions, the actual IQ constellation and its DCs are indirectly determinable.

The DC gains relate to the actual signal channel gains $x_i$ and $x_q$.

Without loss of generality:

$$x_i=\overline{AM(t)}\cos(\sigma_{init}+\sigma_{TXRX}) \text{ and } x_q=\overline{AM(t)}\sin(\sigma_{init}+\sigma_{TXRX}),$$

where $\overline{AM(t)}$ represents the band-limited amplitude modulated ALM signal of the target (e.g. smartcard or electronic ticket) and $x_i$ and $x_q$ represent the channel gains, respectively.

The RMS values of $\overline{AM(t)}$ after matched and smoothing filtering expressed by $x_i$ and $x_q$ are independent of initial phase ($\sigma_{init}$) and only a function of the TX-RX sampling phase delay ($\sigma_{TXRX}$) in order to speak from an unconstrained relation.

Two types of modulation are used to determine whether the RMS values of $\overline{AM(t)}$ after matched and smoothing filtering expressed by $x_i$ and $x_q$ are independent of initial phase ($\sigma_{init}$) and only a function of the TX-RX sampling phase delay ($\sigma_{TXRX}$), and if they are, the baseband gains of $x_i$ and $x_q$ are proportional to the DC values of the sampled mixer I/Q outputs.

The first type of modulation is PLM where the initial phase does not change. It is a modulation delay introduced by the processing time of the actual demodulator and handshake logic.

The second type of modulation is ALM where the carrier can be emitted with an arbitrary initial phase In PLM, the channel gains are a function of the TX-RX phase delay but independent of the modulation delay of a PLM signal.

When the ALM carrier initial phase varies, the channel gains are a function of $\sigma_{init}$ and $\sigma_{TXRX}$ and only when one or the other is known, the channel gains can be determined blindly without knowing the arrival time of the actual response, and the channel gain is constant during a short frame but arbitrary in gain originated by the unknown combination of $\sigma_{init}$ and $\sigma_{TXRX}$.

Therefore, there exists no proportional law between the channel DC value originated by the sampling instant of the receiver and its channel gain related to the received signal and its modulation characteristic.

In the current embodiment, during AM, PLM or modulation schemes providing preambles or other schemes where initial phase $\sigma_{init}$ and TX-RX sampling phase delay $\sigma_{TXRX}$ can be decorrelated, f (nT) can be calculated by:

$$f(nT) = a_1 f_1(nT) + a_2 f_2(nT) = \sum_{j=1}^{N} a_j f_j(nT), \text{ where } a_j = \frac{x_i}{n_j^2},$$

Furthermore, $x_i$ represents the expected RMS signal levels provided by the SCMF and MALP signal conditioning unit and $n_i$ represents the channel noise power provided by the noise variance detector.

In contrast, during phase controlled ALM or other schemes where $\sigma_{init}$ and $\sigma_{TXRX}$ cannot be decorrelated, f (nT) can be calculated by:

$$f(nT) = \sqrt{((a_1 f_1(nT))^2) + ((a_2 f_2(nT))^2)} = \|a_j f_j(nT)\|,$$

$$\text{where } a_j = \frac{1}{n_j^2},$$

where $\|a_j f_j(nT)\|$ represents the norm of the expected RMS signal levels provided by the SCMF and MALP signal conditioning units and $n_j$ represents the individual channel noise power provided by the noise variance detector.

Figure 4:
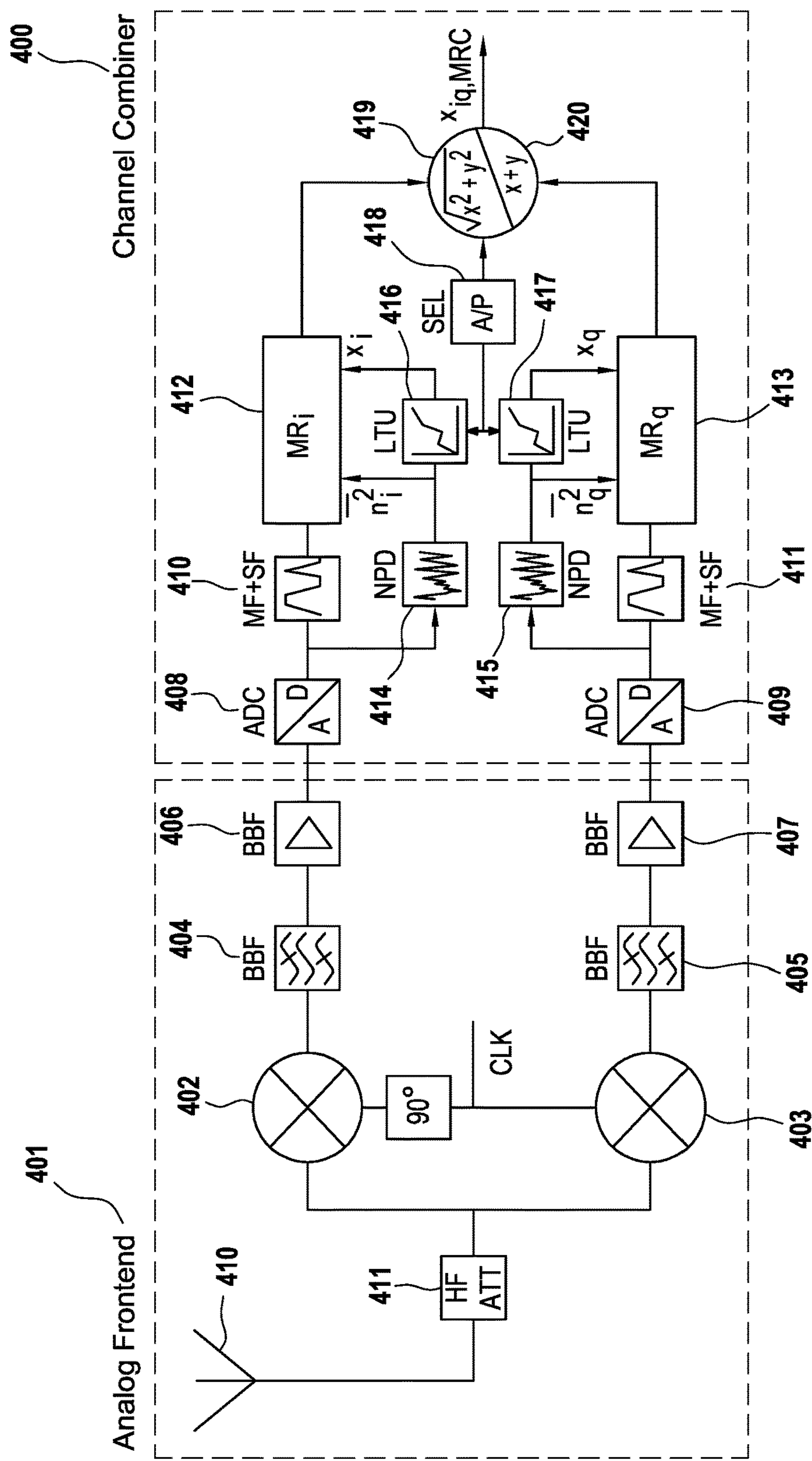
FIG. 4 illustrates a block diagram of a system with a NFC transceiver and a channel combiner.

FIG. 4 illustrates a block diagram of the channel combiner 400 connected to an analog front end ("AFE") 401. The AFE may include a single antenna 410 and a high frequency attenuator 411.

The AFE 401 may further include sampled mixers 402 and 403, baseband filters 404 and 405, baseband amplifiers 406 and 407, and ADC conversion blocks 408 and 409.

The channel combiner 400 may include matching and smoothing filters 410 and 411, maximum ratio combiners 412 and 413, noise power detectors 414 and 415, look up tables 416 and 417, and a selector 418 to select between performing a geometric sum 419 or an arithmetic sum 420.

When the system is set to ALM/PLM reception, the LTU is disabled and the channel combiner 400 performs geometric sum.

When the system is set to PLM only, the LTU is enabled and the channel combiner 400 is switched from geometric sum to arithmetic sum.

Figure 5:
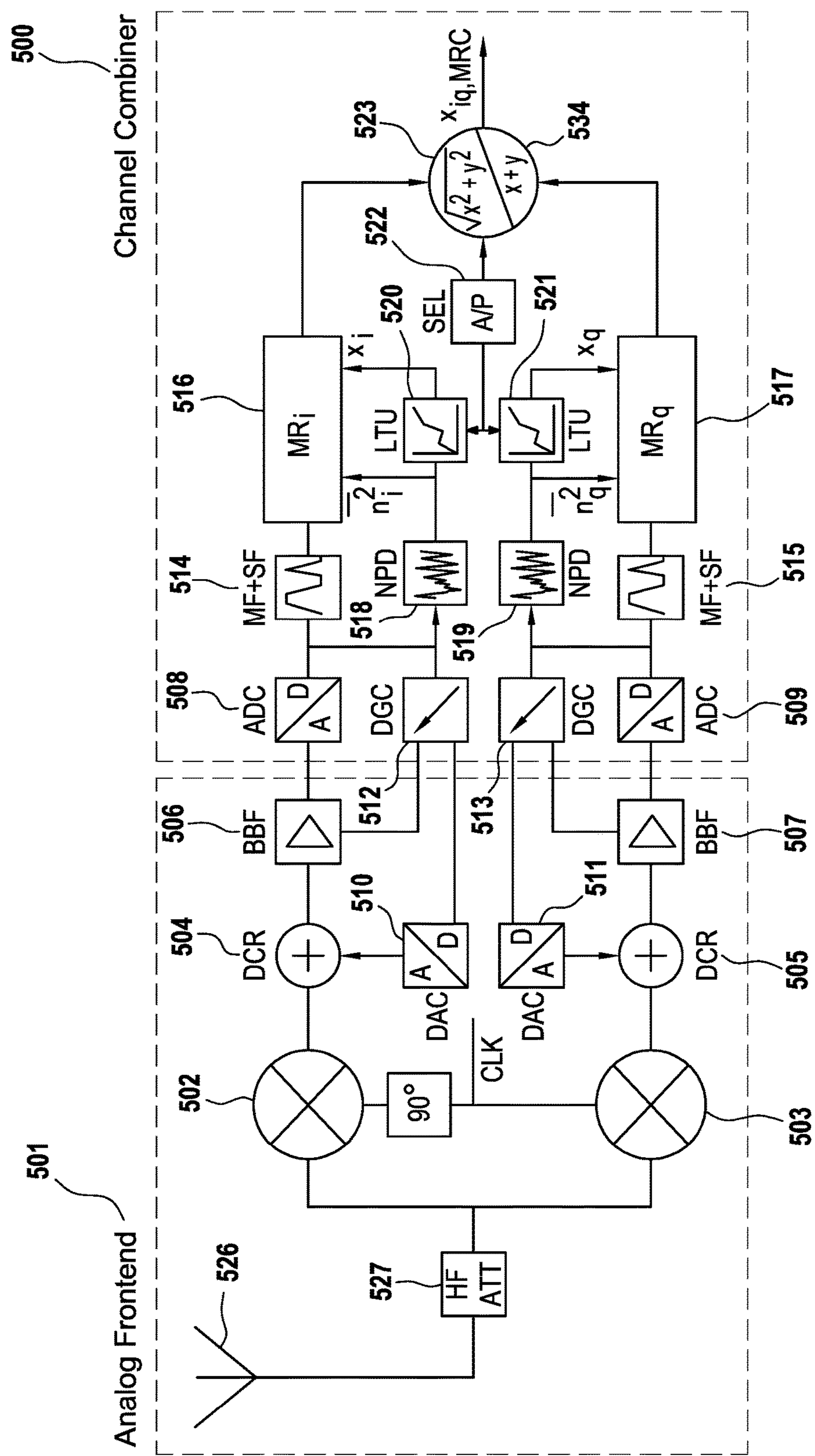
FIG. 5 illustrates a block diagram of a system with a NFC transceiver, including a digital DC removal control loop and a channel combiner.

FIG. 5 illustrates a block diagram of the channel combiner 500 connected to an AFE 501.

The channel combiner 500 may include matching and smoothing filters 514 and 515, maximum ratio combiners 516 and 517, noise power detectors 518 and 519, look up tables 520 and 521, a selector 522 to select between performing a geometric sum 523 or an arithmetic sum 524.

The AFE 500 may include an antenna 526 and a high frequency attenuator 527, sampled mixers 502 and 503, digital DC removal control loops 504 and 505, baseband amplifiers 506 and 507 and ADC conversion blocks 508 and 509.

The digital DC removal control loops 504 and 505 may include digital to analog converters 510 and 511 and digital gain controls 512 and 513.

FIG. 5 further illustrates the channel combiner 500 in combination with the digital DC removal control loops 504 and 505 which filter and perform ADC and DAC conversion.

When the system is set to ALM/PLM reception, the LTU is disabled and the channel combiner 500 performs geometric sum.

When the system is set to PLM only, the LTU is enabled and the channel combiner 500 is switched from geometric sum to arithmetic sum.

Figure 6:
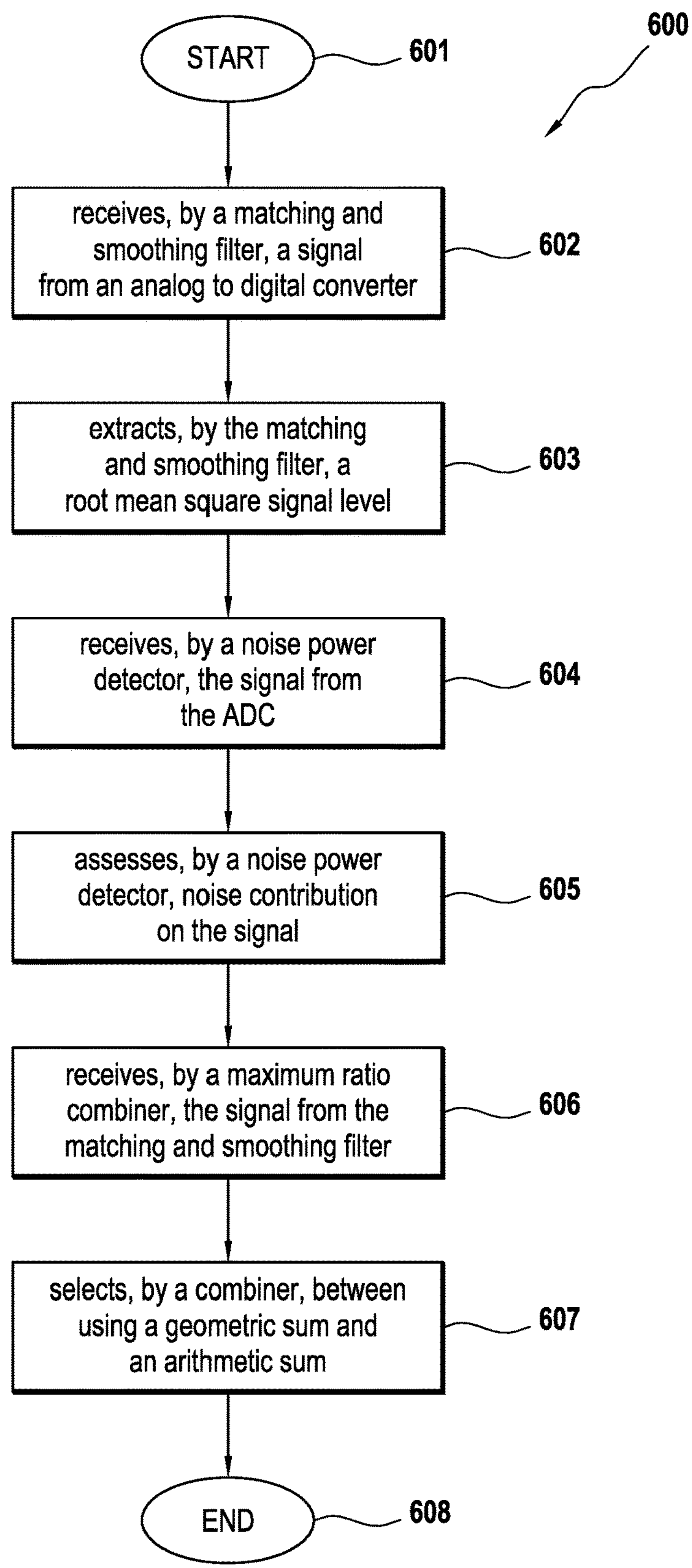
FIG. 6 illustrates a flow chart of a method for combining channels.

FIG. 6 illustrates a method for combining channels 600. The method 600 begins at step 601.

The method 600 then proceeds to step 602 which receives, by a matching and smoothing filter, a signal from an analog to digital converter.

The method 600 then proceeds to step 603 which extracts, by a matching and smoothing filter, a root mean square signal level.

The method 600 then proceeds to step 604 which receives, by a noise power detector, the signal from the ADC.

The method 600 then proceeds to step 605 which assesses, by a noise power detector, noise contribution on the signal.

The method 600 then proceeds to step 606 which receives, by a maximum ratio combiner, the signal from the matching and smoothing filter.

The method 600 then proceeds to step 607 which selects, by a combiner, between using a geometric sum and an arithmetic sum to combine the channels.

The method 600 then proceeds to end at step 608.

The advantage of the current embodiment is the use of noise characteristics for sampled NFC architectures, specifically, using a single antenna and combining the channels in baseband using noise variance only measurement and a geometric combiner.

Noise is mainly related to PLL PM-to-AM conversion related to the sampling instant of the I/Q receiver.

Another advantage of the current embodiment is the use of a matched and smoothing filter structure to extract the RMS signal levels.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A channel combiner coupled to a NFC transceiver, the channel combiner comprising:
- a first and second channel wherein each channel includes:
  - a matching and smoothing filter configured to receive a signal from an analog to digital converter (“ADC”) and configured to extract a root mean square (“RMS”) signal level;
  - a noise power detector (“NPD”) configured to receive the signal from the ADC and assess noise contribution on the signal; and
  - a maximum ratio combiner configured to receive the signal from the matching and smoothing filter, wherein the maximum ratio combiner is configured to receive phase delays from a lookup table; and
- a combiner configured to select between using a geometric sum and an arithmetic sum to combine signals from the first channel and the second channel.

2. The channel combiner coupled to the NFC transceiver of claim 1, wherein the maximum ratio combiner is configured to receive the noise contribution on the signal from the NPD.

3. The channel combiner coupled to the NFC transceiver of claim 1, wherein the lookup table is disabled and the combiner uses a geometric sum when the modulation schemes are active load modulation and passive load modulation.

4. The channel combiner coupled to the NFC transceiver of claim 1, wherein the lookup table is enabled and the channel combiner uses an arithmetic sum when the modulation scheme is passive load modulation.

5. The channel combiner coupled to the NFC transceiver of claim 1, wherein the NFC transceiver includes a baseband filter.

6. The channel combiner coupled to the NFC transceiver of claim 1, wherein the NFC transceiver includes a digital DC removal control loop configured to calculate channel gains.

7. The channel combiner coupled to the NFC transceiver of claim 6, wherein the lookup table is disabled when the modulation schemes are active load modulation and passive load modulation.

8. The channel combiner coupled to the NFC transceiver of claim 6, wherein the lookup table is enabled and the channel combiner uses an arithmetic sum when the modulation scheme is passive load modulation.

9. The channel combiner coupled to the NFC transceiver of claim 1, wherein the RMS signal level are independent of initial phase and a function of a sampling phase delay.

10. A method for combining channels, the method comprising steps of:
- receiving, by a matching and smoothing filter, a signal from an analog to digital converter (“ADC”) and extracting a root mean square (“RMS”) signal level;
- receiving, by a noise power detector (“NPD”), the signal from the ADC and assessing noise contribution on the signal, and
- receiving, by a maximum ratio combiner, the signal from the matching and smoothing filter, wherein
- a combiner selects between using a geometric sum and an arithmetic sum to combine the channels, and wherein the maximum ratio combiner is configured to receive phase delays from a lookup table.

11. The method for combining channels of claim 10, wherein the maximum ratio combiner is configured to receive the noise contribution on the signal from the NPD.

12. The method for combining channels of claim 10, wherein the lookup table is disabled and the combiner uses a geometric sum when the modulation schemes are active load modulation and passive load modulation.

13. The method for combining channels of claim 10, wherein the lookup table is enabled and the channel combiner uses an arithmetic sum when the modulation scheme is passive load modulation.

14. The method for combining channels of claim 10, wherein the NFC transceiver includes a baseband filter.

15. The method for combining channels of claim 10, wherein the NFC transceiver includes a digital DC removal control loop configured to calculate channel gains.

16. The method for combining channels of claim 15, wherein the lookup table is disabled when the modulation schemes are active load modulation and passive load modulation.

17. The method for combining channels of claim 15, wherein the lookup table is enabled and the channel combiner uses an arithmetic sum when the modulation scheme is passive load modulation.

18. The method for combining channels of claim 10, wherein the RMS signal level are independent of initial phase and a function of a sampling phase delay.

* * * * *